United States Patent [19]
Harada et al.

[11] Patent Number: 5,850,045
[45] Date of Patent: Dec. 15, 1998

[54] MAGNETOSTRICTIVE STRESS SENSOR AND APPARATUS APPLYING SAME

[75] Inventors: Koosuke Harada; Ichiro Sasada, both of Fukuoka; Fumitaka Koga, Maebaru; Nobutomo Matsunaga; Shuichi Misumi, both of Kyoto, all of Japan

[73] Assignee: Omron Corporation, Kyoto, Japan

[21] Appl. No.: 464,628

[22] PCT Filed: Dec. 24, 1993

[86] PCT No.: PCT/JP93/01869

§ 371 Date: Jun. 26, 1995

§ 102(e) Date: Jun. 26, 1995

[87] PCT Pub. No.: WO94/15186

PCT Pub. Date: Jul. 7, 1994

[30] Foreign Application Priority Data

Dec. 25, 1992 [JP] Japan ................................. 4-357925
Mar. 24, 1993 [JP] Japan ................................. 5-087772

[51] Int. Cl.⁶ ............................. G01L 3/02; G01L 1/00; G01B 7/16
[52] U.S. Cl. ........................... 73/862.333; 73/779
[58] Field of Search ............................. 73/862.333, 779

[56] References Cited

U.S. PATENT DOCUMENTS

| | | | |
|---|---|---|---|
| 2,749,746 | 6/1956 | Wright | 73/779 |
| 2,977,791 | 4/1961 | Dubsky et al. | 73/779 X |
| 3,469,440 | 9/1969 | Lofgren | 73/779 |
| 3,827,291 | 8/1974 | McCalvey | 73/779 |
| 3,866,462 | 2/1975 | Fraudin | 73/88.5 R |
| 4,088,013 | 5/1978 | Dahle et al. | 73/779 |
| 4,414,856 | 11/1983 | Winterhoff | 73/862.36 |
| 4,646,576 | 3/1987 | Kita | 73/779 |
| 4,918,418 | 4/1990 | Tsala | 73/862.333 X |

FOREIGN PATENT DOCUMENTS

| | | |
|---|---|---|
| 0 046 517 | 8/1982 | European Pat. Off. |
| 0 329 479 | 8/1989 | European Pat. Off. |
| 61-270804 | 12/1986 | Japan |
| 62-184323 | 8/1987 | Japan |
| 62-248013 | 10/1987 | Japan |
| 64-41466 | 2/1989 | Japan |
| 64-19141 | 8/1989 | Japan |
| 2-271506 | 11/1990 | Japan |

(List continued on next page.)

OTHER PUBLICATIONS

*Patent Abstracts of Japan,* vol. 10, No. 198 (P–476) [2254], Jul. 11, 1986 and JP–A–614 041936 (Matsushita Electric Ind. Co. Ltd.), Feb. 28, 1986.

Nonomura et al., "Measurements of Engine Torque with the Intra–Bearing Torque Sensor", *SAE Technical Paper,* 870472, 1988, pp. 2.329–2.339.

(List continued on next page.)

*Primary Examiner*—William L. Oen
*Attorney, Agent, or Firm*—Foley & Lardner

[57] ABSTRACT

Wiring patterns 50, 60 are formed in zigzag fashion on respective ones of both sides of a flexible insulating sheet 70. The wiring patterns 50, 60 include linear portions 50C, 60C and arcuate portions 50A, 60A, respectively. The linear portions 50C and the linear portions 60C overlap. The arcuate portion 60A is situated between two arcuate portions 50A that neighbor each other. One end of each of the wiring patterns 50, 60 is connected to a detection circuit 75 which detects a change in inductance. The other ends of the wiring patterns 50, 60 are connected together through a through-hole 70A. The sheet 70 is disposed in such a manner that the linear portions 50C, 60C will perpendicularly intersect the direction of stress, which is to be measured, acting upon a member 80 undergoing measurement. The sheet 70 and the wiring patterns 50, 60 construct a detection coil 71. An AC excitation current flows through the detection coil 71. When stress is applied to the member 80 undergoing measurement, the permeability of the member changes and so does the inductance of the detection coil 71.

8 Claims, 16 Drawing Sheets

FOREIGN PATENT DOCUMENTS

| | | |
|---|---|---|
| 3-231127 | 10/1991 | Japan . |
| 4-255441 | 9/1992 | Japan . |
| WO 90/01781 | 2/1990 | WIPO . |
| WO 91/00494 | 1/1991 | WIPO . |

OTHER PUBLICATIONS

Yamada et al., "Non–Contact Stress Measuring By Magnetic Anisotropy Sensor", *Magnetics Research Society*, MAG–86–139, pp. 19–27.

Orvar Dahle, "The Ring Torductor—A Torque–Gauge, Without Slip Rings, For industrial Measurement And Control", *ASEA Journal,* vol. 33, No. 3, pp. 23–32, (1960).

I. Sasada et al., "Magnetic–Head Type Torque Sensor without Using Core", Record of 1992 Joint Conference of Electrical and Electronics Engineers in Kyushu, p. 324 (1992).

F. Koga et al., "Optimization of Sense Resistance and Rectification Phase for Magnetic Head Type Torque Sensors using a Phase–Sensitive–Detector", 11th SICE Kyushu Branch Annual Conference, pp. 257–258 (1992).

MAGNETOSTRICTIVE STRESS SENSOR AND APPARATUS APPLYING SAME

TECHNICAL FIELD

This invention relate to a magnetostrictive stress sensor (typically a torque sensor of magnetic head type) and an apparatus to which the sensor is applied.

BACKGROUND ART

A magnetostrictive stress (torque) sensor utilizes one of the magnetostriction phenomena, namely a phenomenon in which the permeability of a ferromagnetic material varies when a mechanical strain is produced in the ferromagnetic material.

An example of a conventional magnetostrictive stress sensor is illustrated in FIG. 29. Two U-shaped cores 161, 162 are used. Excitation coils 163 are wound on the ends of one U-shaped core 161 and an excitation current flows through the coils. Detection coils 164 are wound on the ends of the other U-shaped coil 162 and are connected to a detector (a rectifier, for example). The ends of these U-shaped cores 161, 162 are arranged in close proximity to a ferromagnetic material that is to be sensed or in contact with the material while electrical insulation is maintained between the cores and the material. Here the member in which strain is to be sensed is a rotary shaft 160, a plate-shaped body, etc.

FIG. 30 illustrates a magnetic equivalent circuit of the magnetostrictive sensor shown in FIG. 29. The ends of the core 161 for excitation are indicated at E1, E2, and the ends of the core 162 for detection are indicated at D1, D2.

Four magnetic resistors constructing a bridge in the magnetic equivalent circuit are equal (the bridge circuit is in a state of equilibrium) when a state prevails in which the rotary shaft 160 is not being subjected to a torsional torque. Since a magnetic flux passing through the interior of the detection core 162 does not exist, an induced electromotive force is not produced in the detection coils 162.

When the rotary shaft 160 is twisted in the direction of the arrows, tensile stress and compressive stress are produced in directions at angles of ±45° with respect to the central axis of the rotary shaft 160. The result is a change in the permeability of the rotary shaft. The magnetic resistances of one pair of magnetic resistors in the bridge circuit decrease while the magnetic resistances of the other pair increase. This upsets the equilibrium of the bridge circuit so that a magnetic flux passes through the interior of the detection core 162. As a result, an induced electromotive force V is generated in the detection coils 164.

Such a magnetostrictive stress sensor is described in the following literature:

Yamada, et al., "Non-Contact Stress Measuring by Magnetic Anisotropy Sensor", *Denki Gakkai Kenkyukai Shiryo*, Magnetics Research Society, MAG-86-139, *Denki Gakkai;* and Orvar, "The Ring Torductor—A Torque-Gauge, Without Slip Rings, For Industrial Measurement And Control", ASEA JOURNAL 1960, Volume 33, Number 3, pp. 23–32.

A magnetostrictive stress sensor of this kind requires the two U-shaped cores and further requires two types of coils, namely the excitation coils and the detection coils. Consequently, it is difficult to simplify and reduce the size of the arrangement. In addition, as will be understood also from FIG. 30, a further condition is that the four magnetic resistors constructing the bridge circuit be equal. In general, the member in which strain is to be sensed is formed to have properties (strength, material quality) commensurate with the use of the member and is not made to have properties (four magnetic resistors that are equal) suited to the magnetostrictive stress sensor. Accordingly, the permeability of the member often is so non-uniform as to be an impediment to measurement of strain by the magnetostrictive sensor. The fact that the permeability differs depending upon the location leads to a fluctuation in the zero point of the sensor.

DISCLOSURE OF THE INVENTION

An object of the present invention is to simplify the arrangement and reduce the size of a magnetostrictive stress sensor.

A further object of the present invention is to provide a magnetostrictive stress sensor which is not readily susceptible to the influence of a non-uniformity in the permeability of a member in which strain (torque) is to be sensed.

A further object of the present invention is to provide an apparatus to which such a magnetostrictive stress sensor is applied.

The magnetostrictive stress sensor according to the present invention includes a circular-type detection coil and a sheet-type detection coil.

The circular-type detection coil includes two semicircular coil portions formed by being wound in directions that are the opposite of each other. These semicircular coil portions are arranged with their linear portions being made to coincide so as to construct a circle. The two coil portions are made of a single conductor wire and are so adapted that when a current is passed through the conductor wire, the current flows into the linear portions of the two coil portions in the same direction.

The detection coil is placed in contact with or in close proximity to a member, which is to undergo measurement, in such a manner that the linear portions of the coil perpendicularly intersect the direction of stress, which acts upon the member and is to be sensed, and in such a manner that one face of the coil opposes the member. The detection coil is excited by an AC excitation current. When stress acts upon the portion undergoing measurement, the permeability of the member varies locally. Accordingly, the inductance of the detection coil varies. By detecting the change in inductance, the intensity of the stress acting upon the member being measured is sensed.

In accordance with this invention, the detection coil has a very simple structure and can be formed to be thin. This makes possible a reduction in size. In addition, the detection coil readily deforms so as to adapt itself to the surface of the member to be measured.

In accordance with a preferred embodiment, a core having a high permeability is provided on one face of the detection coil. This makes it possible to raise sensitivity.

In a case where the member to be measured is a rotary shaft, it is preferred that two detection coils be provided. These detection coils are arranged in overlapping form in such a manner that their linear portions perpendicularly intersect and are inclined at an angle of ±45° with respect to the axial direction of the rotary shaft. Detection sensitivity can be raised by taking the difference between the amounts of change in the inductances of the two detection coils. Further, non-uniformity in the permeability of the rotary shaft can be canceled out by the two detection coils.

The circular-type detection coil can be realized in various forms.

In one form, use is made of a plate-shaped circular core in which a groove passing through the center and extending in the diametric direction is formed, and a plate-shape yoke coupled to the circular core. The detection coil is formed by winding a winding about the core and through the groove in such a manner that the winding describes a semicircle and such that when a current is passed through the winding, a current will always flow through linear portions of the winding, which pass through the groove, in the same direction and through portions of the winding about the core in opposite directions at both sides of the groove.

In another form, use is made of a plate-shaped circular core in which two grooves passing through the center and defining the shape of a cross are formed, and a plate-shape yoke coupled to the circular core. A first detection coil is formed by winding a first winding about the core and through one groove in such a manner that the first winding describes a semicircle and such that when a current is passed through the first winding, a current will always flow through the linear portions of the first winding passing through the one groove in the same direction and through the portions of the first winding about the core in opposite directions on both sides of the one groove. A second detection coil is formed by winding a second winding about the core and through the other groove in such a manner that the winding describes a semicircle and such that when a current is passed through the second winding, a current will always flow through the linear portions of the winding passing through the other groove in the same direction and through the portions of the winding about the core in opposite directions on both sides of the other groove.

This arrangement is effective in the scheme in which the two detection coils are provided in overlapping form.

In still another form, the detection coil is realized by forming at least two semicircular coil patterns on at least one film in such a manner that the linear portions of these coil patterns are made to coincide to construct a circle, and the at least two semicircular coil patterns are connected so as to form one current path in such a manner that when a current is passed through these coil patterns, a current will flow through the linear portions of the coil patterns in the same direction and through the semicircular arcuate portions of the coil patterns in opposite directions.

Sheet-type detection coils also may be realized in various forms.

In a first form, first and second wiring patterns are formed in zigzag fashion on respective ones of both sides of an insulating sheet. The first and second wiring patterns each include linear portions and arcuate portions connecting neighboring ones of the linear portions. The first wiring pattern and the second wiring pattern are arranged in such a manner that the linear portions of the first wiring pattern and the linear portions of the second wiring pattern overlap and such that the arcuate portions of the second wiring pattern are situated at positions between neighboring ones of the arcuate portions of the first wiring pattern. One end of the first wiring pattern and one end of the second wiring pattern are interconnected in such a manner that a current will flow through the overlapping linear portions in the same direction.

In a second form, a first wiring pattern is formed in zigzag fashion on one side of a first sheet and a second wiring pattern is formed in zigzag fashion on one side of a second sheet. The first and second wiring patterns each include linear portions and arcuate portions connecting neighboring ones of the linear portions. The first sheet and the second sheet are superposed in such a manner that the linear portions of the first wiring pattern and the linear portions of the second wiring pattern overlap and such that the arcuate portions of the second wiring pattern are situated at positions between neighboring ones of the arcuate portions of the first wiring pattern. One end of the first wiring pattern and one end of the second wiring pattern are interconnected in such a manner that a current will flow through the overlapping linear portions in the same direction.

In a third form, a wiring pattern is formed in zigzag fashion on at least one side of a flexible insulating sheet. Insulation is applied to the wiring pattern. The wiring pattern includes linear portions and arcuate portions connecting neighboring ones of the linear portions. A detection coil is constructed by folding the sheet in such a manner that the linear portions overlap and such that when a current is passed through the wiring pattern, a current will flow through mutually overlapping linear portions in the same direction. Since this form of the detection coil makes multiple overlapping of the coil portions possible, sensitivity is raised in a small area.

The sheet-type detection coil also is placed in contact with or in close proximity to the member undergoing measurement in such a manner that the linear portions of the coil perpendicularly intersect the direction of stress, which acts upon the member and is to be sensed, and in such a manner that one face of the coil opposes the member. The detection coil is excited by an AC excitation current. When stress acts upon the portion undergoing measurement, the permeability of the member varies locally. Accordingly, the inductance of the detection coil varies. By detecting the change in inductance, the intensity of the stress acting upon the member being measured is sensed.

In accordance with this invention, the sheet-type detection coil has a very simple structure and can be formed to be thin. This makes possible a reduction in size. In addition, the detection coil readily deforms so as to conform to the surface of the member to be measured. Furthermore, since the sheet-type detection coil has a large area opposing the member undergoing measurement, the coil is not readily influenced by magnetic non-uniformity of the member.

In accordance with a preferred embodiment, a core having a high permeability is provided on one surface of the sheet-type detection coil. This makes it possible to raise sensitivity.

In a case where the member to be measured is a rotary shaft, it is preferred that two sheet-type detection coils be provided. These detection coils are arranged at such an attitude that the linear portions thereof are inclined at an angle of ±45° with respect to the axial direction of the rotary shaft. Detection sensitivity can be raised by taking the difference between the amounts of change in the inductances of the two detection coils.

The two sheet-type detection coils can also be placed at positions spaced apart from each other or placed so as to partially overlap.

In a preferred embodiment, two sets of the sheet-type detection coil pairs are provided and the four detection coils are connected so as to construct the four sides of a bridge circuit. Sensitivity is improved greatly by this arrangement.

This invention provides an apparatus to which a detection coil of the above-mentioned circular type or sheet type or the above-mentioned magnetostrictive stress sensor is applied.

A bearing apparatus according to the present invention comprises a case having a cylindrical inner circumferential surface, a bearing provided in the case for freely rotatably supporting a rotary shaft in such a manner that a gap is formed between an outer circumferential surface of the rotary shaft to be supported and the above-mentioned inner circumferential surface, and a detection coil of the above-mentioned circular type or sheet type fixed to the inner circumferential surface of the case in such a manner that the linear portions thereof are inclined at an angle of 45° with respect to the axial direction of the rotary shaft.

Since a detection coil for a stress sensor (torsional torque sensor) is incorporated within the bearing apparatus, torque detection becomes possible merely by inserting the rotary shaft into the bearing apparatus.

A power steering apparatus according to this invention comprises a magnetostrictive stress sensor for sensing torsional torque that acts upon a steering shaft, an auxiliary motor for generating auxiliary torque, and a controller for controlling the auxiliary motor based upon torque sensed by the magnetostrictive stress sensor.

A torque control apparatus according to this invention comprises a motor serving as a power source, a power transmission mechanism for transmitting rotating force from the motor to an output shaft, a magnetostrictive stress sensor for sensing torsional torque that acts upon a rotary shaft in the power transmission mechanism, and a controller for controlling the motor in such a manner that the torque sensed by the magnetostrictive stress sensor attains a predetermined prescribed value.

BRIEF DESCRIPTION OF THE DRAWINGS

FIGS. 1 through 6 illustrate the detection principles (first aspect) of a first embodiment, in which:

FIG. 1 is a perspective view showing a detection coil, which arranged so as to sense the torsional torque of a rotary shaft, as well as the rotary shaft;

FIG. 2 is a side view of the rotary shaft and detection coil;

FIG. 3 illustrates an example of a winding method in the detection coil;

FIG. 4 illustrates an example of another winding method in the detection coil;

FIG. 5 is an equivalent circuit of the detection coil; and

FIG. 6 is a circuit diagram showing an example of a detection circuit;

FIGS. 7 and 8 illustrate the detection principles (second aspect) of the first embodiment, in which:

FIG. 7 is a perspective view showing a detection coil, which is arranged so as to sense the torsional torque of a rotary shaft, as well as the rotary shaft and FIG. 8 is a circuit diagram showing an example of a detection circuit;

FIGS. 9 through 11 illustrate the detection principles (third aspect) of the first embodiment, in which:

FIG. 9 is a perspective view showing a detection coil, which is arranged so as to sense the torsional torque of a rotary shaft, as well as the rotary shaft;

FIG. 10 is for describing the fact that two superposed detection coils do not have a magnetic influence upon each other; and FIG. 11 is a graph showing an example of measurement of the characteristics of a detection coil;

FIGS. 18 and 19 illustrate a first basic arrangement of a second embodiment, in which:

FIG. 18 is a plan view of a detection coil, which is placed so as to measure tensile stress, and a member to be measured, and FIG. 19 is a side view of the detection coil and the member to be measured;

FIGS. 20 and 21 illustrate a second basic arrangement of the second embodiment, in which:

FIG. 20 is a perspective view showing detection coils, which are placed so as to measure the torsional torque of a rotary shaft, as well as the rotary shaft, FIG. 21 is a circuit diagram showing a detection circuit;

FIGS. 22 through 24 illustrate a third basic arrangement of the second embodiment, in which:

FIG. 22 is a perspective view showing detection coils, which are placed so as to measure the torsional torque of a rotary shaft, as well as the rotary shaft;

FIG. 23 illustrates, in enlarged form, the overlapping portions of detection coils; and FIG. 24 is a circuit diagram showing a detection circuit;

FIG. 31 further illustrates the fourth basic arrangement of the second embodiment.

BEST MODE FOR CARRYING OUT THE INVENTION

First Embodiment

Principles of Detection (First Aspect)

Figure 1:
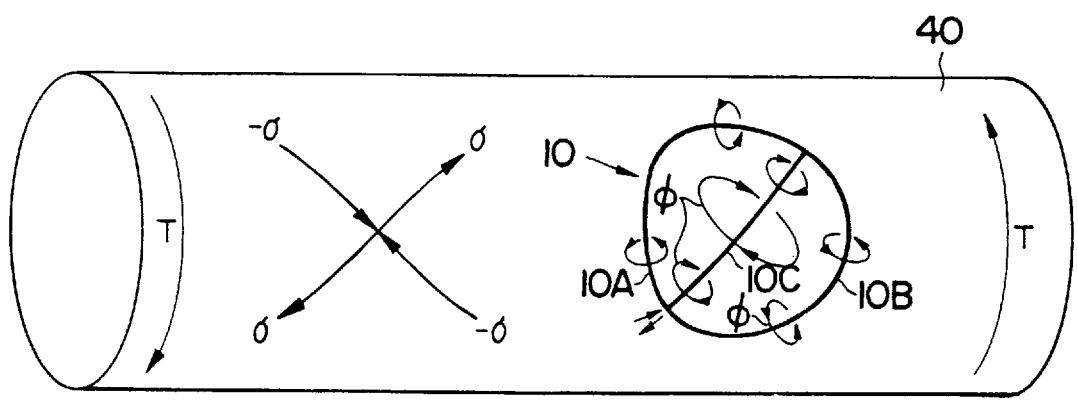
Figure 2:
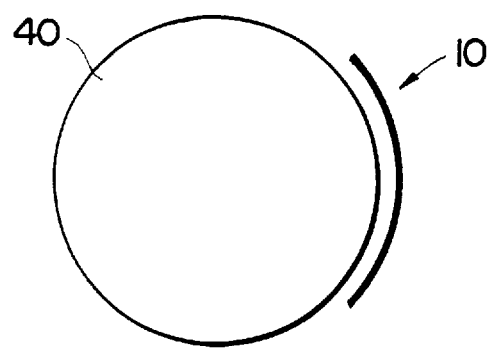

As shown in FIGS. 1 and 2, a magnetostrictive stress sensor includes one detection coil 10. A member under measurement in which strain (or torque) is to be detected is a rotary shaft 40 which here is formed of carbon steel. The detection coil is constituted by two semicircular portions 10A, 10B and a linear portion 10C passing through the center. As will be described later in detail, the detection coil 10 is formed by patterning an electrically conductive material such as copper on a flexible, non-magnetic insulating film such as a flexible printed wiring board (hereinafter referred to as an "FPWB") or by being wound on a core. The detection coil 10 is disposed along the outer peripheral surface of the rotary shaft 40 with a small, uniform gap being maintained between them.

Figure 3:
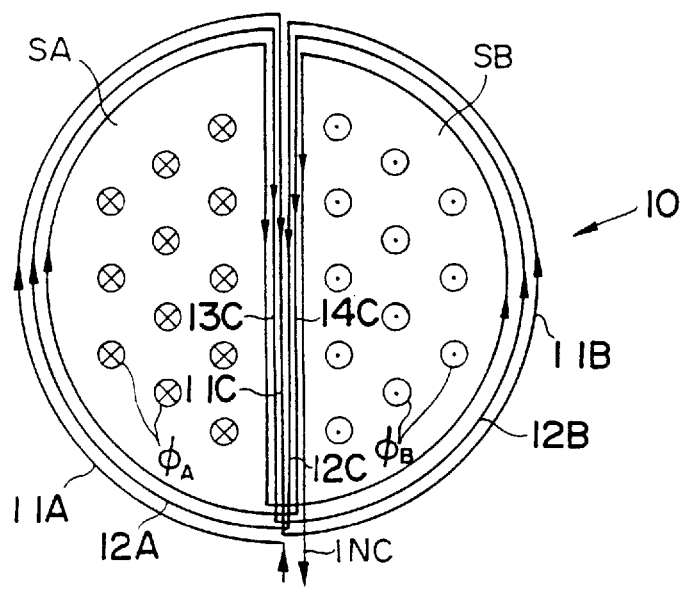
Figure 4:
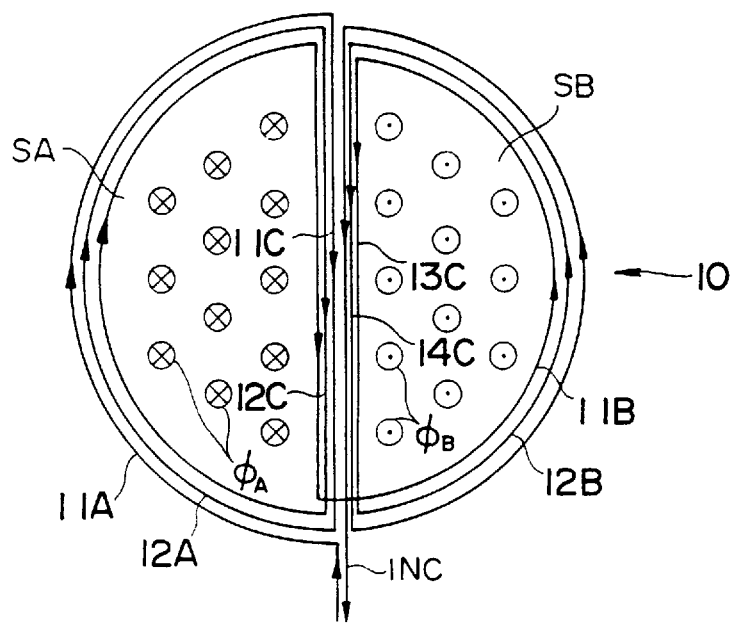

Though the detection coil 10 may consist of only one turn, it is preferred that the coil be wound so as to have a plurality of turns. Examples of methods of winding the detection coil 10 are illustrated in FIGS. 3 and 4, in which the left, right, upper and lower sides are decided as shown on the paper for the sake of facilitating the description. Further, the arrows represent the direction (at a certain instant) of an AC excitation current which flows through the coil.

As shown in FIG. 3, the coil is led from the bottom to the top upon being passed (wound) about the left half (left semicircular portion 11A) in the form of a semicircle, led directly downward (linear portion 11C) from the top through the center of the circle, led from the bottom to the top again upon being passed (wound) about the right half (right semicircular portion 11B) in the form of a semicircle, and led directly downward (linear portion 12C) from the top through the center of the circle. This is one turn.

Next, the coil is again led from the bottom to the top upon being passed about the left half (left semicircular portion 12A) in the form of a semicircle, led linearly downward (linear portion 13C) from the top through the center of the circle, led from the bottom to the top again upon being passed (wound) about the right half (right semicircular portion 12B) in the form of a semicircle, and led directly downward (linear portion 14C) from the top through the center of the circle. This is a second turn.

The desired number of turns are wound in similar fashion and the winding is finally led out from a linear portion 1NC.

In order to facilitate the creation of the drawings, the left semicircular portions 11A, 12A are drawn in a somewhat offset manner. However, these overlap so as to appear as one when viewed from above. The same is true for the right semicircular portions 11B, 12B and the linear portions 11C~1NC.

When a current is passed across both ends of the detection coil 10, the current in the left semicircular portion 10A (the left semicircular portions 11A, 12A, etc., shall be referred to collectively as 10A) and the current in the right semicircular portion 10B (the right semicircular portions 11B, 12B, etc., shall be referred to collectively as 10B) flow in mutually opposing directions. The current flows in the same direction in all of the linear portions 10C (the linear portions 11C, 12C, 13C, 14C, 1NC, etc., shall be referred to collectively as 10C).

Accordingly, a magnetic flux $\phi_A$ which passes through a space SA bounded by the left semicircular portion 10A and the linear portion 10C and a magnetic flux $\phi_B$ which passes through a space SB bounded by the right semicircular portion 10B and the linear portion 10C are oppositely directed. A magnetic flux $\phi$ is formed about the linear portion 10C by the fluxes $\phi_A$, $\phi_B$ (see FIG. 1). Of course, fluxes are produced about the semicircular portions 10A, 10B as well but these fluxes are small and take no part in stress measurement.

As shown in FIG. 4, first the left half is wound a prescribed number of times. More specifically, the winding is led from the bottom to the top upon being passed about the left half (left semicircular portion 11A) in the form of a semicircle and is led directly downward (linear portion 11C) from the top through the center of the circle. The winding is again led from the bottom to the top upon being passed about the left half (left semicircular portion 12A) in the form of a semicircle and is led directly downward (linear portion 12C) from the top through the center of the circle. When winding of a prescribed plurality of turns is finished for the left half, a transition is made to winding of the right half. Here the winding is led from the bottom to the top upon being passed about the right half (right semicircular portion 11B) in the form of a semicircle and is led directly downward (linear portion 13C) from the top through the center of the circle. The winding is again led from the bottom to the top upon being passed about the right half (right semicircular portion 12B) in the form of a semicircle and is led directly downward (linear portion 14C) from the top through the center of the circle. After the winding of a prescribed plurality of turns has been performed for the right half, the lead portion is let out.

Current flows in exactly the same manner as shown in FIG. 3 in this detection coil as well, and fluxes $\phi A$, $\phi B$ ($\phi$) of the same form are produced.

A detection coil of such configuration is thin, simple in structure and is capable of being made small in size. In addition, the detection coil can be formed into a shape that is curved so as to conform to the outer circumferential surface of a rotary shaft having a circular cross section. Since there is a large amount of space, there is a good heat-radiating effect. These are examples of features possessed by the detection coil.

With reference again to FIGS. 1 and 2, the application of torsional torque T to the rotary shaft 40 produces a tensile stress a and a compressive stress $-\sigma$ in the rotary shaft 40 in directions at angles of $\pm 45°$ with respect to the central axis of the shaft. Owing to these stresses, the permeability of the rotary shaft 40 changes at the locations of stress occurrence. In order to sense the change in permeability caused by torsional torque, the detection coil 10 is disposed in such a manner that the linear portion 10C thereof is inclined at an angle of 45° with respect to the central axis of the rotary shaft 40.

Let L1, L2 represent the self-inductances of the left and right semicircular coil portions, respectively, of the detection coil 10, and let M represent the mutual inductance of these coil portions. Inductance L of the detection coil 10 will then be expressed by $$L=L1+L2+M2$$

Figure 5:
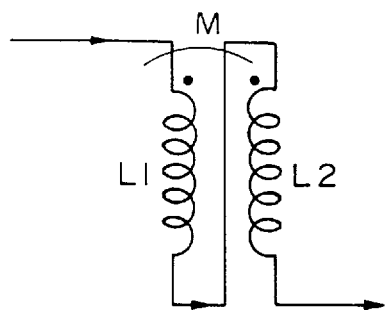

FIG. 5 illustrates the equivalent circuit of the detection coil 10.

The mutual inductance M varies owing to the local change in the permeability of the rotary shaft 10 brought about by the stress $\pm \sigma$, which is produced by the torque T applied to the rotary shaft 40. (In FIG. 1, the linear portion 10C is perpendicular to the direction of the compressive stress $-\sigma$, and therefore M decreases.) Accordingly, the inductance L of the detection coil 10 varies.

The size of the torque T can be sensed by sensing this change in inductance L. To sense the change in inductance L, a constant voltage can be impressed across the ends of the detection coil 10 in advance and the change in inductance can be sensed as a change in the current that flows. Alternatively, the current that flows through the detection coil 10 can be held constant and the change in inductance can be sensed as a change in voltage.

Figure 6:
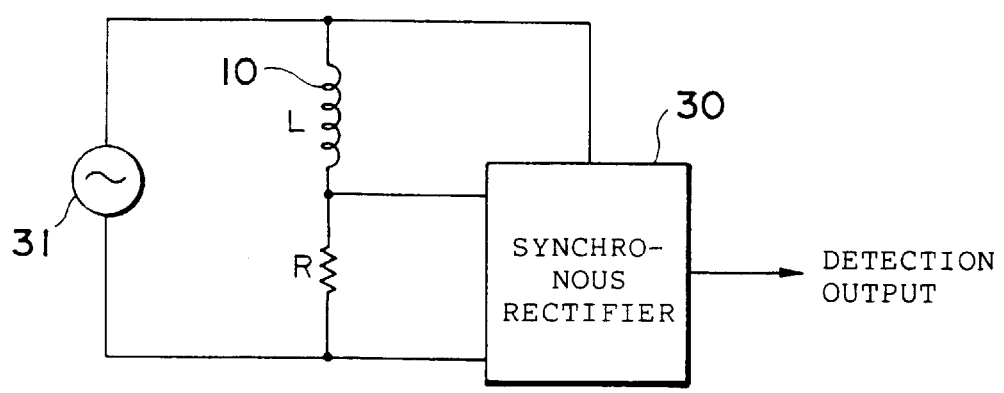

An example of the detection circuit is illustrated in FIG. 6. A circuit composed of the serially connected detection coil 10 and a resistor R is excited by an AC power supply 31. The voltage across the resistor R is smoothed by a synchronous rectifier 30 or by some other rectifier. The difference between the smoothed output when torque is not being applied and the smoothed output when torque is being applied represents the magnitude of the torque.

Principles of Detection (Second Aspect)

Figure 7:
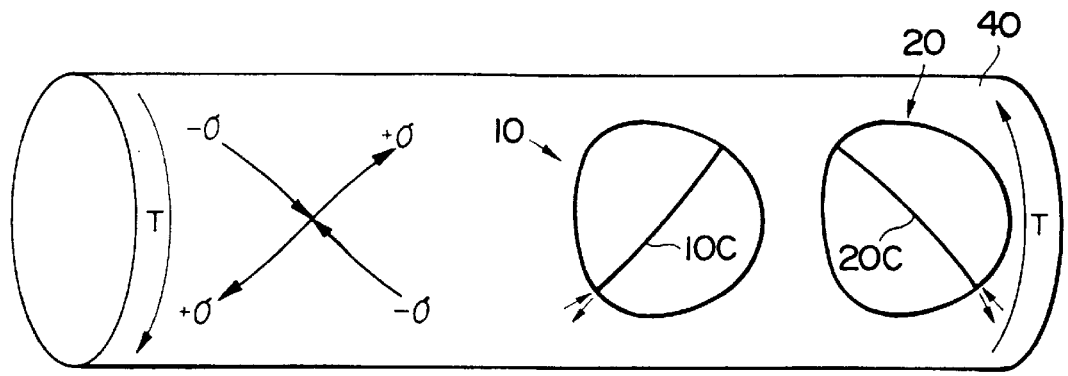

As shown in FIG. 7, a magnetostrictive stress sensor includes two detection coils 10, 20. These detection coils have a structure identical with that of the detection coil 10 described earlier. The direction of the linear portion 10C of detection coil 10 and the direction of a linear portion 20C of detection coil 20 differ by 90°. That is, the linear portion 10C of the detection coil 10 perpendicularly intersects the direction of compressive stress $-\sigma$, and the linear portion 20C of the detection coil 10 perpendicularly intersects the direction of tensile stress $+\sigma$. These detection coils 20, 20 also are curved so as to conform to the outer circumferential surface of the rotary shaft 40 with a uniform spacing between them and the shaft. The detection coils 10 and 20 are disposed far enough apart so as not to influence each other.

Figure 8:
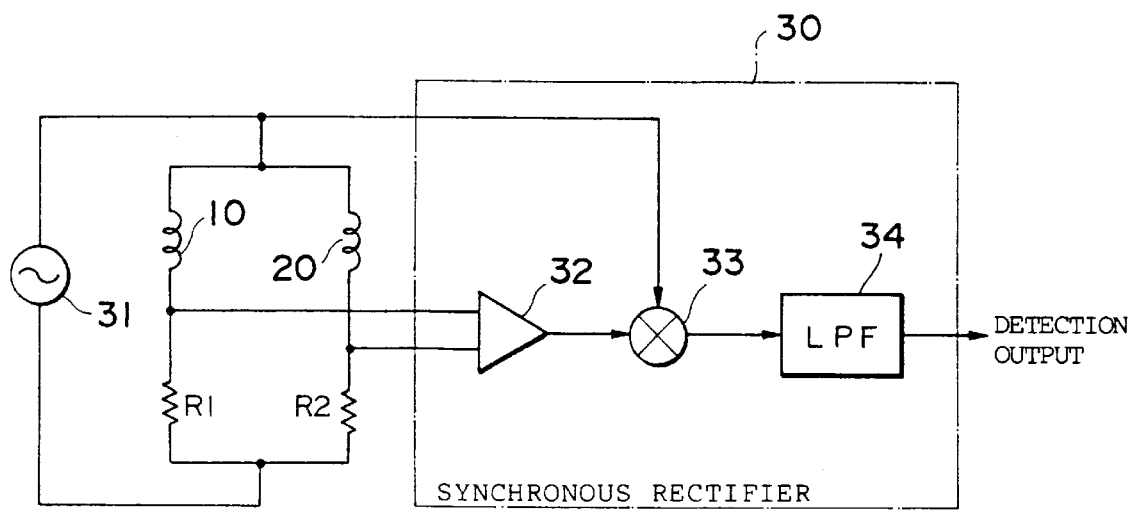

FIG. 8 illustrates an example of the detection circuit of the magnetostrictive stress sensor having the two detection coils 10, 20 thus placed. The detection coil 10 is connected in series with a resistor R1, and the detection coil 20 is connected in series with a resistor R2. These two serially connected circuit are connected in parallel (to construct a bridge circuit) and are driven by the AC power supply 31.

The junction of the detection coil 10 and resistor R1 and the junction of the detection coil 20 and resistor R2 are connected to the input side of a differential amplifier circuit 32 in the synchronous rectifier 30. The excitation signal outputted by the AC power supply 31 and the output signal of the differential amplifier circuit 32 are multiplied together in a multiplier 33. The output of the multiplier 33 is applied to a low-pass filter (LPF) 34 so that the DC component is extracted. The output of the LPF 34 serves as a detection output indicative of stress.

The bridge circuit is adjusted in advance so as to attain a state of equilibrium when the torsional torque T is not being applied to the rotary shaft 40. The output of the differential amplifier circuit 32 at this time is zero.

When the torsional torque T is applied to the rotary shaft 40, the inductance of the detection coil 10 decreases and the inductance of the detection coil 20 increases. As a result, the bridge circuit becomes unbalanced and a detection output conforming to the degree of imbalance is obtained from the synchronous rectifier 30.

When the two detection coils 10, 20 thus placed are used, these inductances vary in positive and negative directions and the differential output between them can be obtained. As a result, the sensitivity of the magnetostrictive stress sensor is raised.

Coils (inductances) may be used instead of the resistors R1, R2 in the detection circuit. Using the coils raises the sensitivity of the bridge circuit. Besides the rectifying smoothing circuit, the detection circuit is capable of employing a circuit for detecting rms value, a peak holding circuit, etc.

Principles of Detection (Third Aspect)

Figure 9:
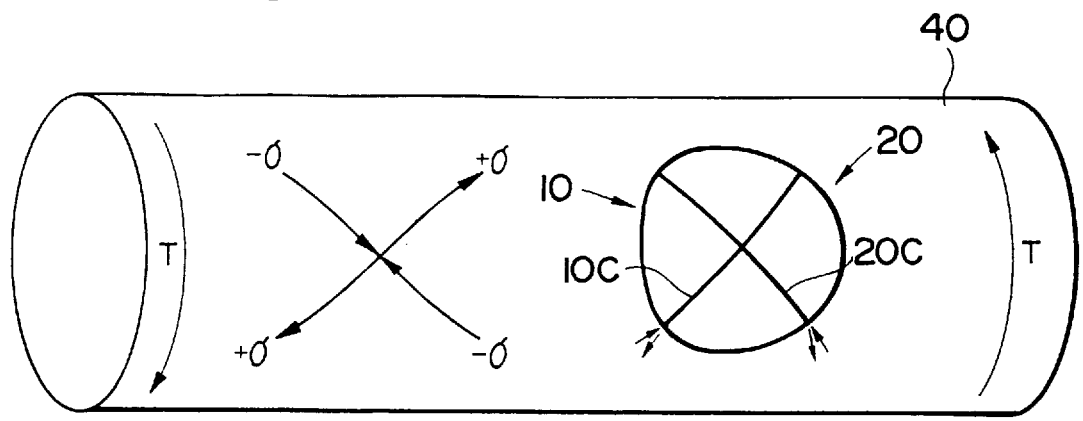

As shown in FIG. 9, two detection coils 10 and 20 are perfectly superposed, one above the other. The linear portion 10C of detection coil 10 and the linear portion 20C of detection coil 20 are perpendicular to each other. The detection circuit illustrated in FIG. 8 also is used for the detection coils 10, 20 thus. disposed.

Figure 10:
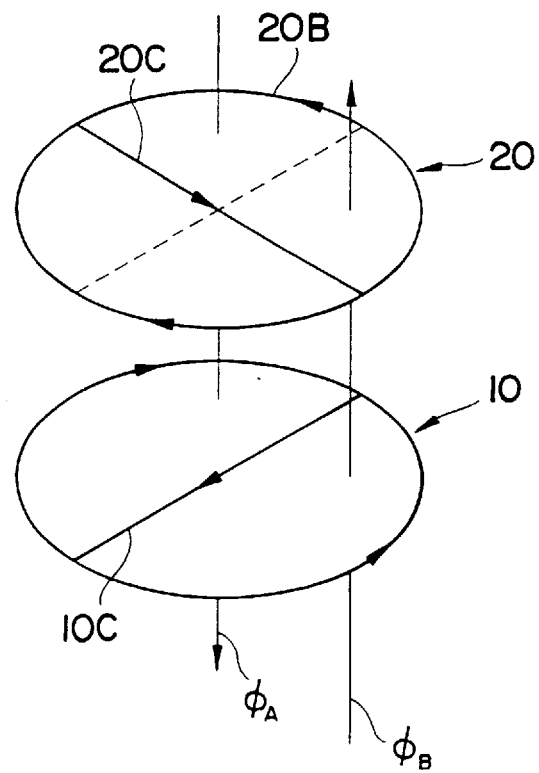

If the two detection coils 10 and 20 are perfectly superposed one above the other (provided that the linear portions 10C and 20C perpendicularly intersect each other), the detection coils 10, 20 do will not affect each other. The reason for this is as follows:

In FIG. 10, consider one semicircular coil portion (composed of the linear portion 20C and the semicircular portion 20B) of the detection coil 20. Magnetic fluxes $\phi_A$ and $\phi_B$, which are produced by the respective semicircular coil portions of detection coil 10, are oppositely directed and equal in strength. The fluxes of the fluxes $\phi_A$, which pass through said one semicircular coil portion of the detection coil 20, and the fluxes of the fluxes $\phi_B$, which pass through the same semicircular coil portion of the detection coil 20, are also oppositely directed and equal in strength. Accordingly, the sum total of the fluxes which pass through the interior of one of the semicircular portions of the detection coil 20 is zero. In other words, the flux produced by the detection coil 10 does not interlink with the above-mentioned semicircular coil portion. Likewise, the flux produced by the detection coil 10 does not interlink with the other semicircular coil portion of detection coil 20. The flux produced by the detection coil 20 also does not interlink with either portion of the detection coil 10. Accordingly, there is no magnetic interaction between the detection coils 10 and 20.

The arrangement and structure shown in FIG. 9 are characterized in that the two detection coils 10 and 20 can be placed at one location. Since a differential output between the amounts of change in the inductances of the detection coils 10 and 20 can be obtained, an advantage is that sensitivity is raised. Furthermore, since non-uniformity in the permeability of the rotary shaft 40 is canceled in the inductances of the two detection coils 10, 20, a feature is that a fluctuation in the zero point of the detection circuit can be avoided.

Figure 11:
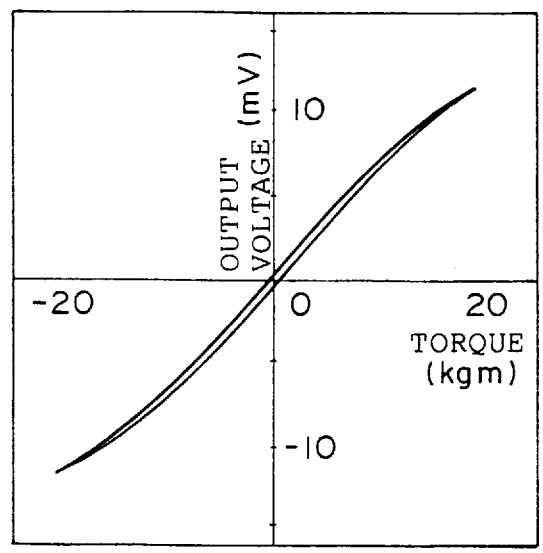

FIG. 11 illustrates the measured characteristics of a magnetostrictive stress sensor having the arrangement and structure shown in FIG. 9. The detection coils 10 and 20 used in measurement each had 25 turns and a diameter of 20 mm. The excitation current applied to the detection coils 10, 20 from the AC power supply was 1.2 A (constant), and the excitation frequency was 80 KHz. The rotary shaft 40 consisted of carbon steel and has a diameter of 25 mm. The torsional torque T applied to the rotary shaft 40 was varied over a range of −20 to 20 Kgm.

The output voltage of the detection circuit exhibits fairly good linearity (with some hysteresis) with respect to a change in torque. The output voltage varies over a negative and positive range depending upon the direction of the torque.

Examples of the Arrangement

Figure 12:
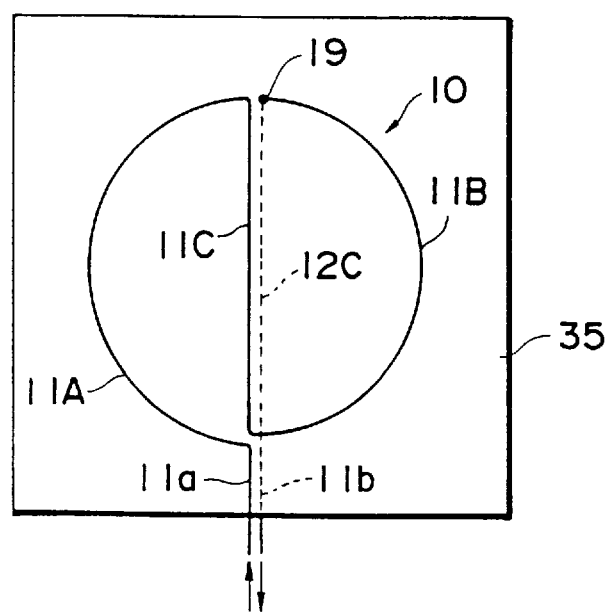
FIG. 12 is a plan view showing an example of the construction of a detection coil.

FIG. 12 illustrates the manner in which a coil pattern is formed on an FPWB by an electrically conductive material. The left semicircular portion 11A, linear portion 1C, right semicircular portion 11B and a lead portion 11a connected to the left semicircular portion 11A are formed on the front surface of a single FPWB by printing. The linear portion 12C and a lead 11b connected thereto are formed on the rear side of the FPWB 35. The right semicircular portion 11B and the linear portion 12C are connected to each other through a through-hole 19. As a result, a single-turn detection coil 10 is constructed.

In order to construct a detection coil of a plurality of turns, it will suffice to superpose a plurality of FPWBs on each of which the single-turn coil pattern has been formed (with an insulating film being formed on the coil patterns) and connect these coil patterns electrically through through-holes.

Figure 13:
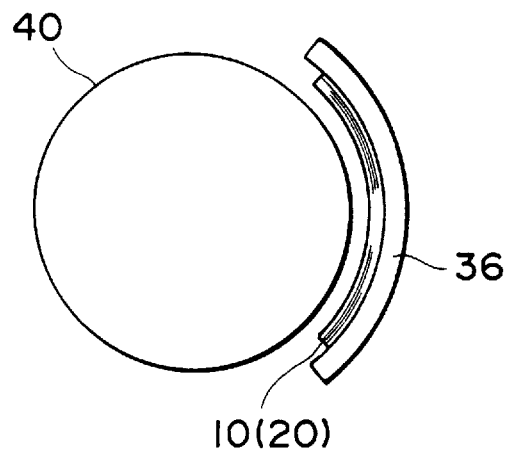
FIG. 13 is a side view showing another example of the construction of a detection coil.

FIG. 13 illustrates an arrangement in which a high-permeability yoke member 36, e.g., an amorphous yoke, is disposed on the rear side (the surface opposite the side which opposes the rotary shaft 40) of the detection coil 10 formed by winding a winding wire or by using the FPWB in the manner set forth above (or the superposed detection coils 10 and 20). Since the magnetic flux produced by the detection coil 10 (and 20) passes through the interior of the yoke 36, the coil inductance is raised and detection sensitivity is improved.

The detection coil 10 (and 20) may be bonded to the outer circumferential surface of the rotary shaft 40 directly (or via an insulating film) (at least maintaining electrical insulation between the coil and the rotary shaft 40).

Figure 14:
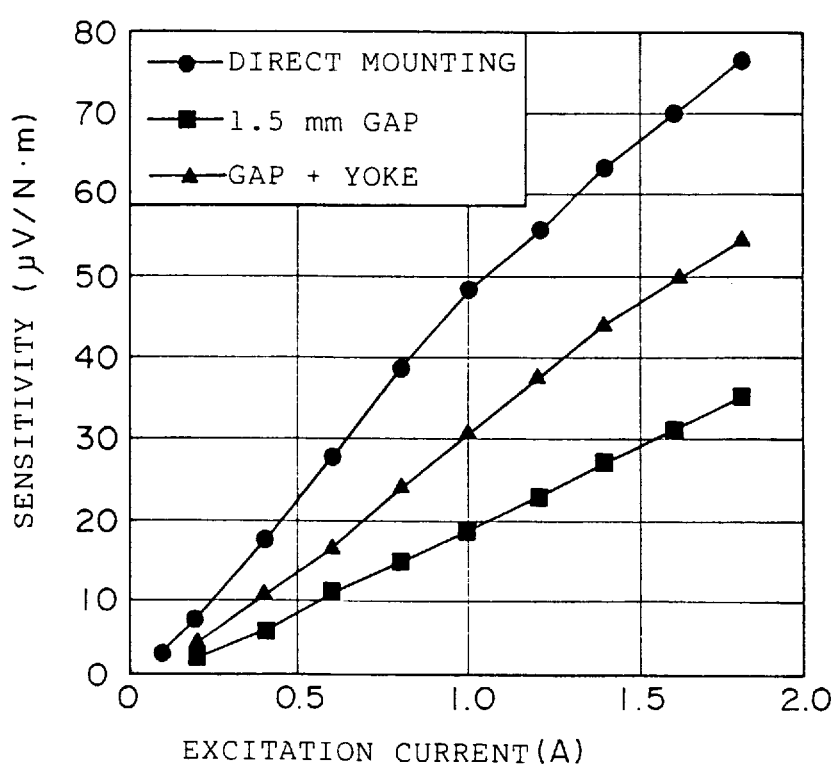
FIG. 14 is a graph illustrating results of measurement regarding the sensitivity of detection coils in three schemes.

FIG. 14 illustrates differences in sensitivity obtained in three types of structure or mounting schemes, mentioned below. The two superposed detection coils 10, 20 illustrated in FIG. 9 are used. The three types of schemes are:

(1) a scheme (direct mounting) in which the detection coils are adhered directly to the outer circumferential surface of the rotary shaft;

(2) a scheme (with 1.5 mm gap) in which the detection coils are disposed so as to be spaced away from the outer circumferential surface of the rotary shaft by 1.5 mm; and (3) a scheme (gap+yoke) in which the rear side of the detection coils is provided with an amorphous yoke and the detection coils are disposed so as to be spaced away from the outer circumferential surface of the rotary shaft by 1.5 mm.

All of these schemes function as stress sensors, as will be understood from the graph. Direct mounting provides the highest sensitivity. In a case where the detection coils are spaced away from the rotary shaft, providing the yoke raises the sensitivity.

Figure 15:
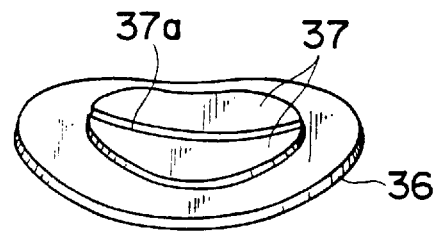
FIGS. 15 through 17 are perspective views illustrating examples of cores and yokes on which detection coils are wound.

FIG. 15 illustrates an example in which a circular core 37 is formed on a yoke 36 as an integral part thereof. The yoke 36 and core 37 are composed of a material having a high permeability. The core 37 is formed to have a groove 37a in the diametric direction thereof and passing through the center of the core. The yoke 36 and core 37 are curved so as to conform to the outer circumferential surface of the rotary shaft 40. A detection coil is formed by winding a winding wire about the core 37 and inside the groove 37a in the manner illustrated in FIG. 3 or FIG. 4.

Figure 16:
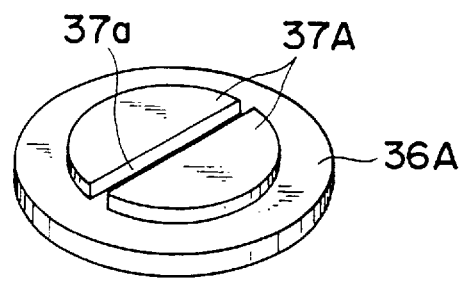

FIG. 16 illustrates another example. A circular yoke 36A and a circular core 37A have a flat plate-shaped configuration and are not curved. A detection coil formed using such a yoke and core is fully applicable to a member having a curved circumferential surface, such as a rotary shaft.

Figure 17:
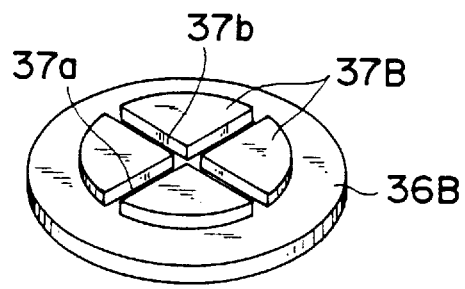

FIG. 17 illustrates a yoke 36B and a core 37B applied to two detection coils superposed as shown in FIG. 9. The circular core 37B is formed to have grooves 37a, 27b in the form of a cross.

In a case where a measured member in which stress is to be sensed is a rotary shaft, problems do not arise, even if the rotary shaft is rotated a plurality of times, if the detection coil is disposed so as to be spaced away from the rotary shaft. In a case where the detection coil is bonded to the outer circumferential surface of the rotary shaft, it is preferred that the rotary shaft be rotated by less than one revolution insofar that it is necessary to draw out a lead wire from the detection coil. It is of course possible to use a slip ring to achieve electrical connection with a detection coil bonded to the rotary shaft. An arrangement may be adopted in which the detection coil is adhered to the inner circumferential surface of a cylindrical case, which constructs part of the bearing of the rotary shaft, as illustrated in a third embodiment described later. In this way the detection coil is held a fixed distance away from the outer circumferential surface of the rotary shaft.

The measured member in which stress is to be sensed is not limited to a rotary shaft. The member may be a flat plate. In the case of the flat plate, compressive stress or tensile stress applied to the flat plate would be measured. The detection coil is arranged in such a manner that the linear portion thereof perpendicularly intersects the direction of the stress to be measured.

Second Embodiment

Basic Arrangement 1 (For measuring tensile stress and compressive stress)

Figure 18:
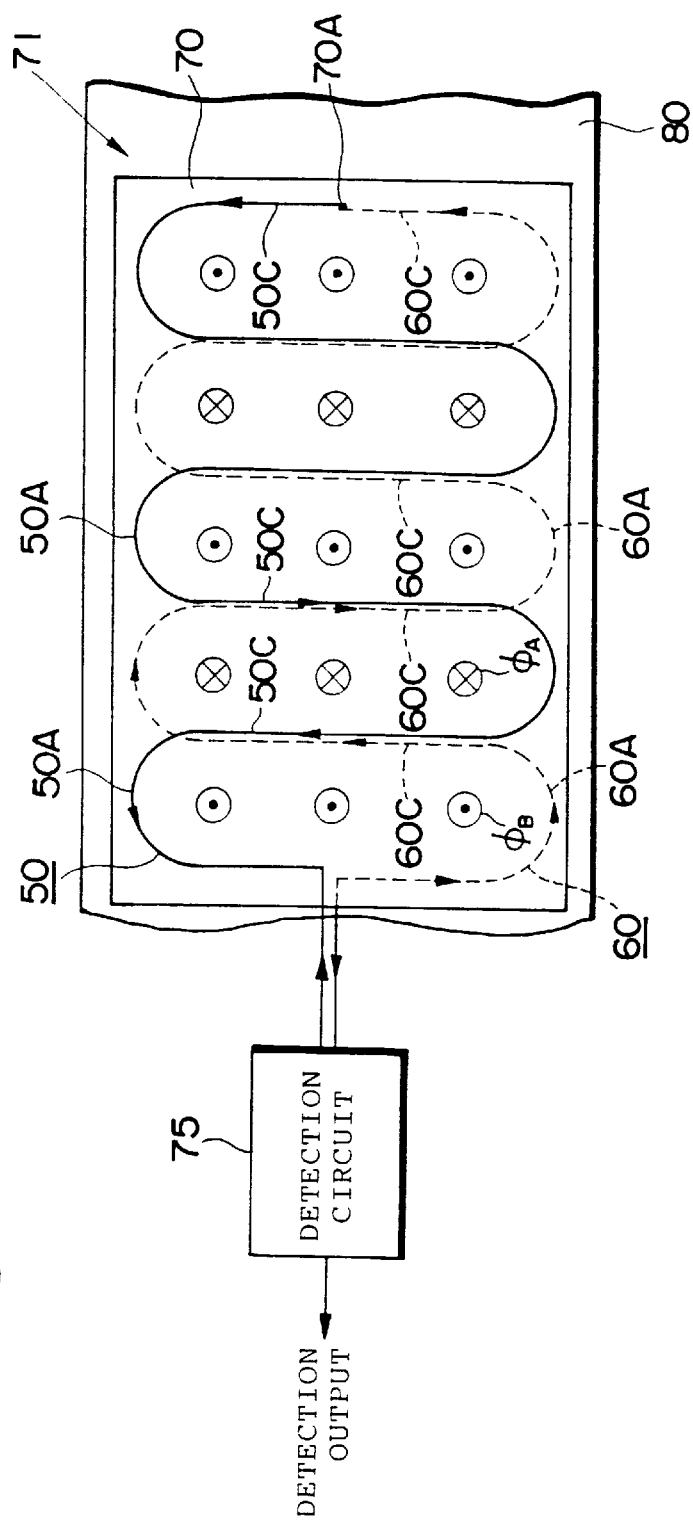
Figure 19:
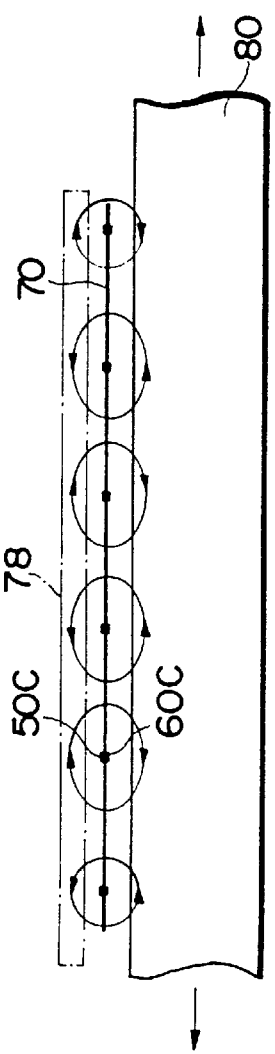

As shown in FIGS. 18 and 19, wiring patterns 50 and 60 are formed in zigzag fashion on the top and bottom sides of a non-magnetic flexible film (such as the above-mentioned FPWB) 70 exhibiting an electrical insulation property. The wiring pattern 50 is formed on the top side of the film 70 and is constituted by parallel linear portions 50C and arcuate portions 50A connecting neighboring ones of the linear portions 50C. The wiring pattern 60 is formed on the bottom side of the film 70 and is constituted by parallel linear portions 60C and arcuate portions 60A connecting neighboring ones of the linear portions 60C. The linear portions 50C and 60C overlap each other perfectly with the film 70 being interposed between them. (In FIG. 18, the linear portions 50C and 60C are drawn in a somewhat offset manner in order to illustrate them in an easily understandable manner.) The wiring patterns 50 and 60 meander in mutually opposing directions (i.e., so as to be offset from each other by a half cycle). Accordingly, the arcuate portions 60A do not exist at locations of the bottom side that correspond to the arcuate portions 50A, and the arcuate portions 50A do not exist at locations of the top side that correspond to the arcuate portions 60A. Rather, an arcuate portion 60A is located on the bottom side of the film 70 at positions between two arcuate portions 50A on the top side. One end of the wiring pattern 50 and one end of the wiring pattern 60 are connected to a detection circuit 75 by lead wires, and the other ends of these wiring patterns terminate at points halfway along linear portions 50A, 60A, where they are interconnected via a through-hole 70A formed in the film 70. Such wiring pattern 50, 60 are formed by printing a material having good electrical conductivity, such as copper, on the top and bottom sides of the film 70, or by forming an electrically conductive layer on each of the top and bottom sides of the film 70 and etching away portions other than those that will constitute the wiring patterns. Preferably, an insulating protective film is formed on the top and bottom sides of the film 70 on top of the wiring patterns 50, 60.

An AC excitation current is passed through these wiring patterns 50, 60 by the detection circuit 75. The direction of the current at any instant is indicated by the arrows drawn on the wiring patterns 50, 60. One turn of a coil portion is formed by a single segment (half-cycle portion) of the meandering wiring pattern 50 (which segment comprises one linear portion and one arcuate portion), and a single corresponding segment of the meandering wiring pattern 60. Accordingly, a detection coil 71 in which coil portions of a plurality of turns are planarly (two-dimensionally) arrayed is formed by the wiring patterns 50 and 60. (The film 70 and the wiring patterns 50, 60 shall be referred to collectively as the detection coil 71.) Mutually opposing magnetic fluxes $\phi_A$, $\phi_B$ are produced in mutually adjacent single-turn coil portions by the excitation current. These fluxes constitute a flux which revolves about the linear portions 50C, 60C. Though fluxes are also formed about the arcuate portions 50A, 60A, these are small and do not take part in stress measurement.

The detection coil 71 is bonded to the surface of a measured member 80, in which stress is to be sensed, while electrical insulation is maintained between them, or is spaced a small distance away from the surface. Preferably, a yoke 78 comprising a high-permeability material, such as an amorphous yoke, is disposed on the side of the detection coil 71 that is opposite the member 80. If the detection coil 71 is bonded to the yoke 78 while electrical insulation is maintained between them, the detection coil 71 is made easier to hold. The member 80 to be measured is a rod-shaped or plate-shaped member. The detection coil 71 is placed on the measured member 80 in such a manner that tensile stress or compressive stress acting upon the member 80 and the linear portions 50C, 60C of the detection coil 71 are perpendicular.

When tensile stress is applied to the measured member 80, the inductance of the detection coil 71 varies (increases). The tensile stress which acts upon the member 80 can be measured by detecting the amount of change in inductance using the detection circuit 75. When compressive stress is applied to the member 80, the inductance of the detection coil 71 decreases and, hence, compressive stress can be detected in the same manner. The detection circuit 75 used is that illustrated in FIG. 6. Further, the detection coil 71 may be connected to one side of the bridge circuit shown in FIG. 8, and coils (inductances) or resistors may be connected to the other three sides of the bridge.

It goes without saying that the number of zigzags in the wiring patterns 50, 60 formed on the film 70 is arbitrary. Since a plurality of single-turn coil portions are spread two-dimensionally in the detection coil 71, a comparatively large area of the measured member 80 is covered. Accordingly, even if the permeability of the measured member 80 is not uniform and possesses portions of some non-uniformity, the influence upon the measured results is small. It can be safely said that the larger the area of the detection coil 71, the smaller the deviation in the zero point. Further, since the detection coil 71 is spread over space, its heat radiating property is good. This means that it is possible to deal adequately with a case in which it is required that a comparatively large excitation current be passed through the coil.

Though the wiring patterns 50 and 60 are formed respectively on the top and bottom sides of the single film 70, the invention is not limited to this arrangement. For example, an arrangement can be adopted in which the wiring pattern 50 is formed on one side of one film and the wiring pattern 60 on one side of a second film, these two films are superposed in such a manner that the linear portions 50C and 60C overlap but the arcuate portions 50A and 60A do not, one end of each of the wiring patterns 50 and 60 is connected to the detection circuit and the other ends are connected together.

Basic Arrangement 2 (For measuring torsional torque)

When the member to be measured is a rotary shaft 81 and torsional torque has been applied to the rotary shaft 81, tensile stress and compressive stress produced in directions at angles of ±45° with respect to the axial direction are measured.

Figure 20:
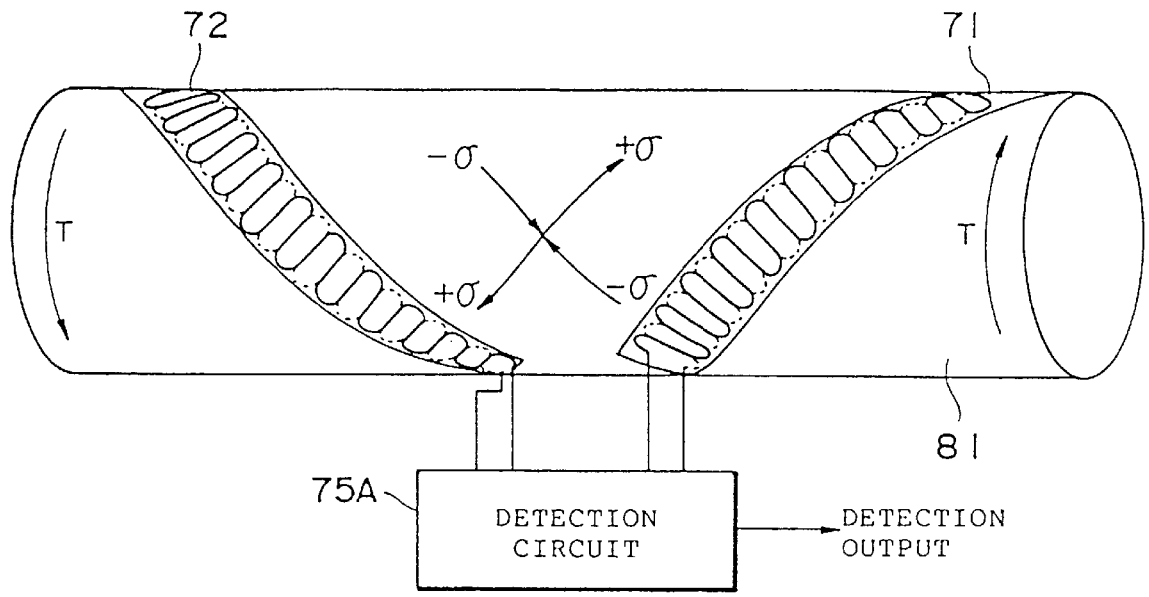

Two detection coils 71 and 72 are used as shown in FIG. 20. The construction of these coils is identical with that shown in FIG. 18. The two detection coils 71 and 72 are adhered to the outer circumferential surface of the rotary shaft 81 obliquely, while electrical insulation is maintained between them, so as to define angles of +45° and −45° with respect to the axial direction. The linear portions (linear portions 50C, 60C) of the wiring pattern of detection coil 71 perpendicularly intersect the direction of tensile stress σ.

The linear portions of the wiring pattern of detection coil 72 perpendicularly intersect the direction of compressive stress −σ. Further, the detection coils 71 and 72 are provided in spaced relation to such an extent that their magnetic fields with not influence each other. Rather than being adhered to the outer circumferential surface of the rotary shaft 81, the detection coils 71, 72 may be so disposed as to conform to the outer circumferential surface while the spacing between the coils and the outer circumferential surface is held constant. (See the third embodiment, described later.)

Figure 21:
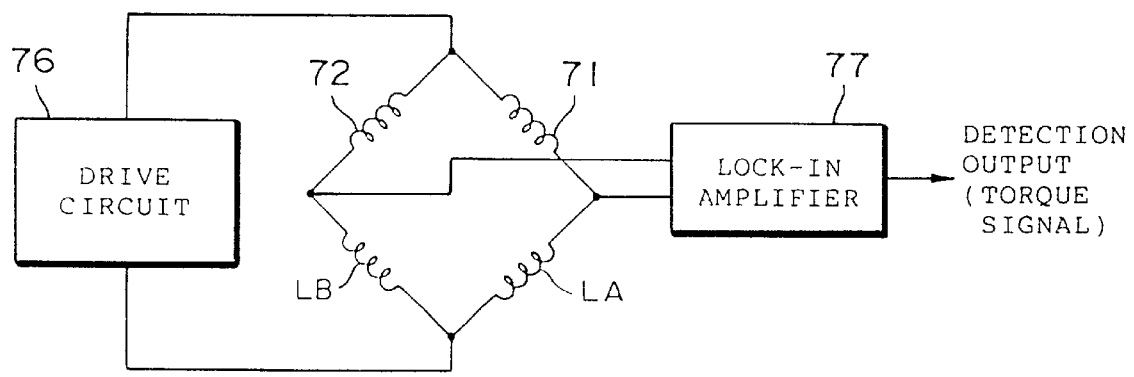

An example of the detection circuit is shown in FIG. 21. The detection coils 71 and 72 are connected to two sides of the bridge circuit. Coils (inductances) LA, LB (or resistors) are connected to the other two sides. An excitation current is applied to the bridge circuit by a drive circuit 76 (identical to the AC power supply 31). The bridge circuit is adjusted in advance so as to be balanced when the torsional torque T is not being applied to the rotary shaft 81. When the torsional torque T is applied to the rotary shaft 81, the inductance of the detection coil 71 increases and the inductance of the detection coil 72 decreases. Accordingly, the bridge circuit becomes unbalanced. The voltage imbalance in the bridge circuit is detected by a lock-in amplifier 77 (identical to the above-mentioned synchronous rectifier). The output of the lock-in amplifier 77 serves as a detection output indicative of torque (or stress).

Since the detection coils 71, 72 are obtained by forming wiring patterns on flexible films, they can be readily flexed and made to conform to the outer circumferential surface of the rotary shaft 81. Moreover, single-turn coil portions comprising the wiring pattern are never deformed to such an extent that measured is hampered. The greater the lengths of the detection coils 71, 72 (i.e., the greater the number of single-turn portions), the higher the sensitivity can be made and the smaller the influence of non-uniformity of in permeability present in the rotary shaft 81. The detection coils 71, 72 may be wound about the rotary shaft 81 one or more times and the lengths thereof are arbitrary. Naturally, if the detection coils 71, 72 are made great in length, a large space will be required. Accordingly, the lengths of the detection coils 71, 72 should be determined upon taking sensitivity and installation space into account.

It is not necessarily required that two detection coils 71, 72 be provided. Only one detection coil 71 or 71 may be used. In such case the detection circuit described in Basic Arrangement 1 would be used.

Basic Arrangement 3 (Scheme in which detection coils are partially overlapped)

Figure 22:
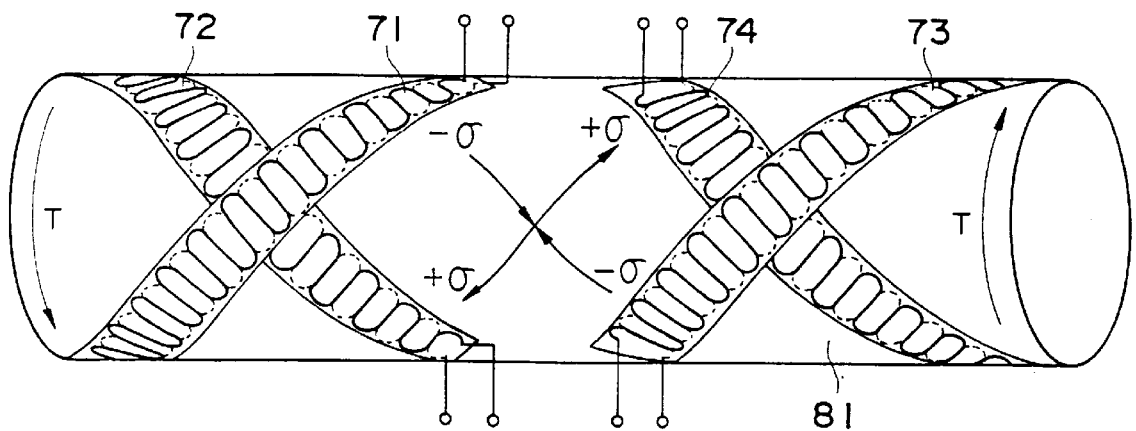

In the arrangement and construction shown in FIG. 22, four detection coils 71, 72, 73 and 74 are provided. The detection coils 71 and 72 are placed so as to partially overlap (preferably at their mid-portions) and perpendicularly intersect each other. The detection coils 73 and 74 are placed so as to partially overlap (preferably at their mid-portions) and perpendicularly intersect each other. The detection coils 71~74 are inclined at angles of ±45° with respect to the axial direction of the rotary shaft 81 and conform to the outer circumferential surface of the rotary shaft 81. (It does not matter whether the detection coils are bonded directly to the outer circumferential surface while electrical insulation is maintained between them or are disposed with a uniform spacing between them and the outer circumferential surface.) The construction of the detection coils 71~74 is identical with that shown in FIG. 18.

Figure 23:
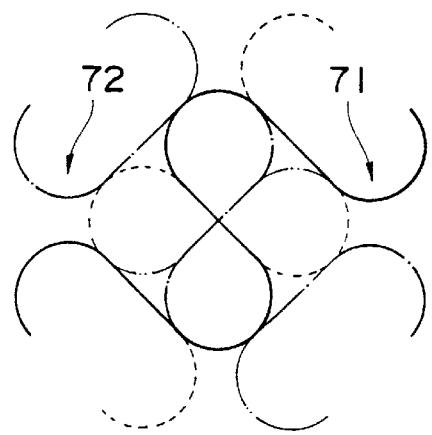

The portions at which the two detection coils 71 and 72 overlap are shown in enlarged form in FIG. 23. The two wiring patterns constructing detection coil 71 are represented by a solid line and a dashed line, and the two wiring patterns constructing detection coil 72 are represented by a one-dot chain line and a two-dot chain line. The detection coil 71 has two single-turn portions, and so does the detection coil 72, where they overlap each other. The magnetic flux produced by the single-turn portion of detection coil 71 does not interlink with the single-turn coil portion of the detection coil 72 by reason of a principle identical with that described with reference to FIG. 10. Likewise, the magnetic flux produced by the single-turn portion of detection coil 72 does not interlink with the single-turn coil portion of the detection coil 71. Thus, the detection coils 71 and 72 do not influence each other magnetically and they are mutually independent just as in the case where both detection coils 71, 72 are disposed in spaced-apart relation. Even if there is leakage flux at the overlapping portions, the magnetic effects produced thereby are canceled out.

Figure 24:
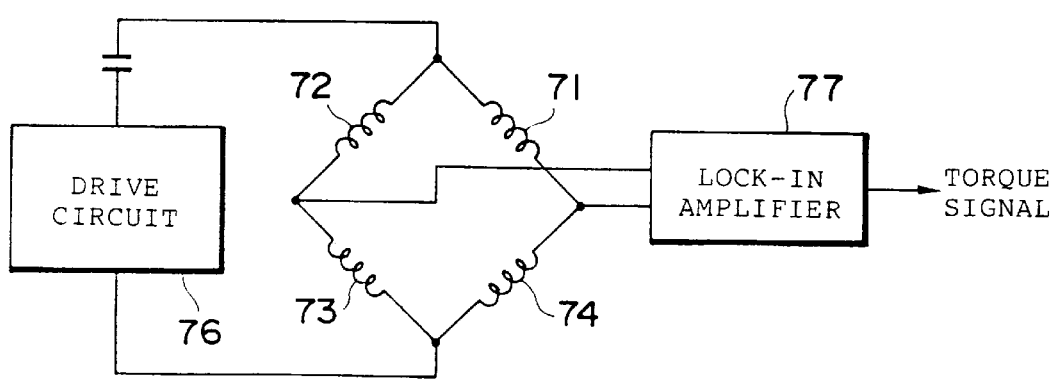

FIG. 24 illustrates an example of the detection circuit. A bridge circuit is constructed by detection coils 71, 72, 73 and 74. The bridge circuit is adjusted in advance so as to be balanced when torsional torque is not being applied to the rotary shaft 81. Other structural features are the same as those shown in FIG. 21. Since four detection coils are used, a high sensitivity is obtained.

The detection coils 73 and 74 can be omitted and a stress sensor can be constructed by using the detection coils 71 and 72. In such case the detection circuit depicted in FIG. 21 would be used.

Basic Arrangement 4 (Other construction of detection coil)

Figure 25:
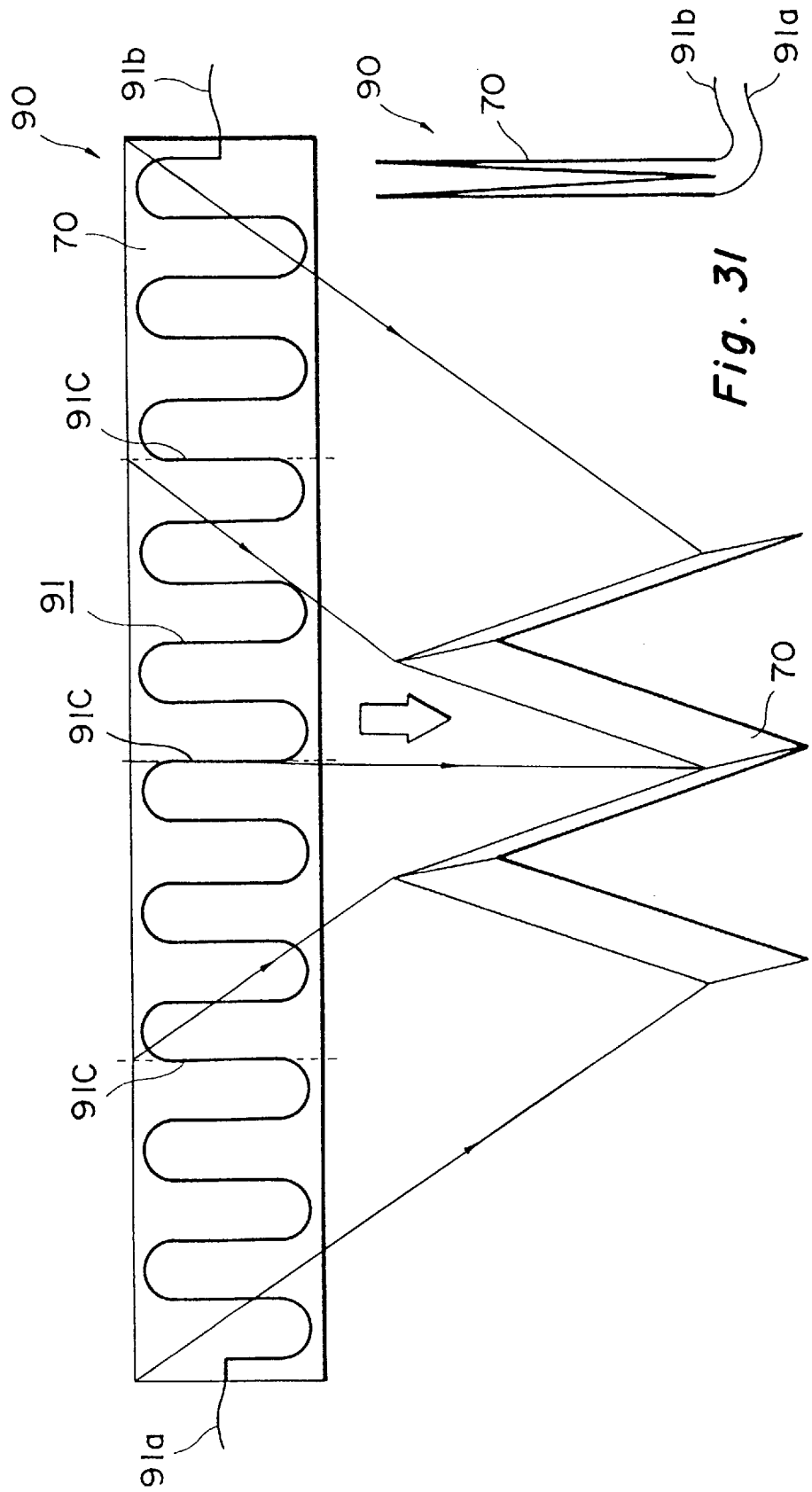
FIG. 25 illustrates a fourth basic arrangement of the second embodiment and shows the manner in which a detection coil is made.

FIG. 25 illustrates another example of the construction of a detection coil. Here a wiring pattern 91 is formed in zigzag fashion on one side of a thin, flexible film such as an FPWB, and an insulating film is formed on the surface of the wiring pattern 91. Rather than forming the insulating film, it is permissible to superpose one more insulating flexible film on the wiring pattern. An electrically conductive pad is formed on both end faces of the wiring pattern 91 and lead wires 91a, 91b are connected to the respective pads.

The film 70 is folded at the positions of linear portions 91C of the wiring pattern 91 so as to overlap itself. The positions of the folds are so determined that an even number of linear portions 91C will be present between those linear portions 91C located at neighboring fold positions. In this embodiment, the film 70 is folded at three locations so that four portions of the film are folded over one another, as best seen in FIG. 31.

In accordance with this arrangement, a single turn of a coil portion is formed by one zigzag portion of a wiring pattern formed on two film portions that have been superposed. Since four film portions are superposed in this embodiment, coil portions are formed in two layers, one above the other. Since coil portions can thus be formed one above the other in multiple layers, the number of turns per unit area is increased and sensitivity is raised. The fact that the film 70 is thin means that overall thickness will not be that large even if the film is folded over in multiple layers.

A film on which two wiring patterns have been formed on respective ones of its top and bottom sides, as shown in FIG. 18, may be folded. This will raise sensitivity greatly.

Third Embodiment

Figure 26:
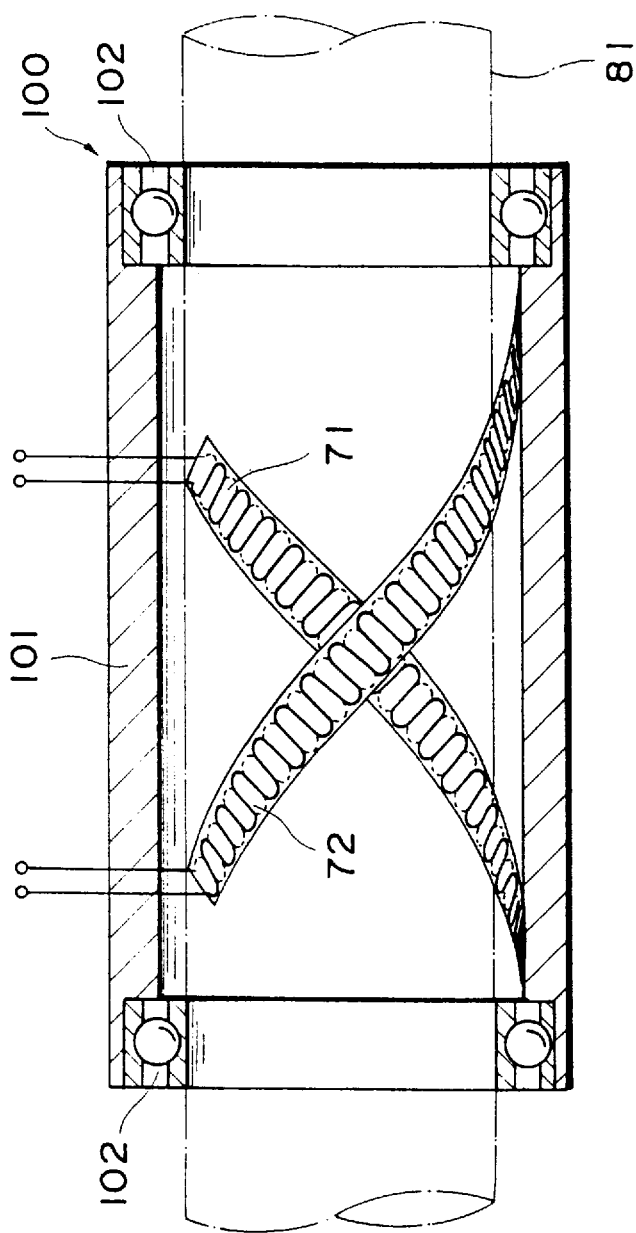
FIG. 26, which illustrates a third embodiment, is a sectional view of a bearing apparatus.

A third embodiment relates to a bearing internally accommodating a detection coil used in a magnetostrictive stress sensor. This is illustrated in FIG. 26.

A bearing apparatus 100 is constituted by a cylindrical case 101 opened at both ends, and ball bearings 102 incorporated within both end portions of the case 101. If necessary, a fixing flange for fixing the case 101 and other members are attached to the outer side of the case 101.

There is a uniform clearance between the inner circumferential surface of the case 101 of the bearing apparatus 100 and the rotary shaft 81 freely rotatably received in the ball bearings 102 of the bearing apparatus 100. The two detection coils 71 and 72 are adhered to the inner circumferential surface of the case 101, while electrical insulation is maintained between them and the surface, in such a state that two coils are inclined at angles of ±45° with respect to the axial direction of the rotary shaft 81 held by the bearings 102. The two detection coils 71 and 72 overlap at portions thereof and perpendicularly intersect each other. The arrangement shown in FIG. 18 or the arrangement illustrated in FIG. 25 may be used for the detection coils. The detection coils 71 and 72 are connected to the detection circuit.

Thus, a bearing apparatus is realized in which the rotary shaft is received in a freely rotatable manner and a torsional torque which acts upon the rotary shaft is capable of being sensed. The detection coils are held with a uniform spacing between themselves and the outer circumferential surface of the rotary shaft. Members for holding the detection coils need not be specially provided. Since the detection coils do not contact the rotary shaft, they do not sustain damage. The detection coils can be formed to be thin and therefore do not require a large amount of space within the bearing apparatus. Accordingly, the detection coils can be applied also to a small-size bearing apparatus, such as a bearing apparatus which receives a rotary shaft having a diameter of 1 mm or less. It is also possible to sense the torsional torque of a small-diameter rotary shaft.

The lengths of the detection coils 71, 72 are arbitrary and so are the number thereof. It is also possible for the detection coils 10, 20 shown in FIGS. 1, 7 and 9 to be attached to the inner circumferential surface of the case of the bearing apparatus.

The bearings of the bearing apparatus are not limited to ball bearings and may be roller bearings. The invention is applicable to slip bearings as well. If necessary, the surface of the detection coil can be covered with a resin to protect it.

Example of Application (1)

Electrically driven power steering apparatus

Figure 27:
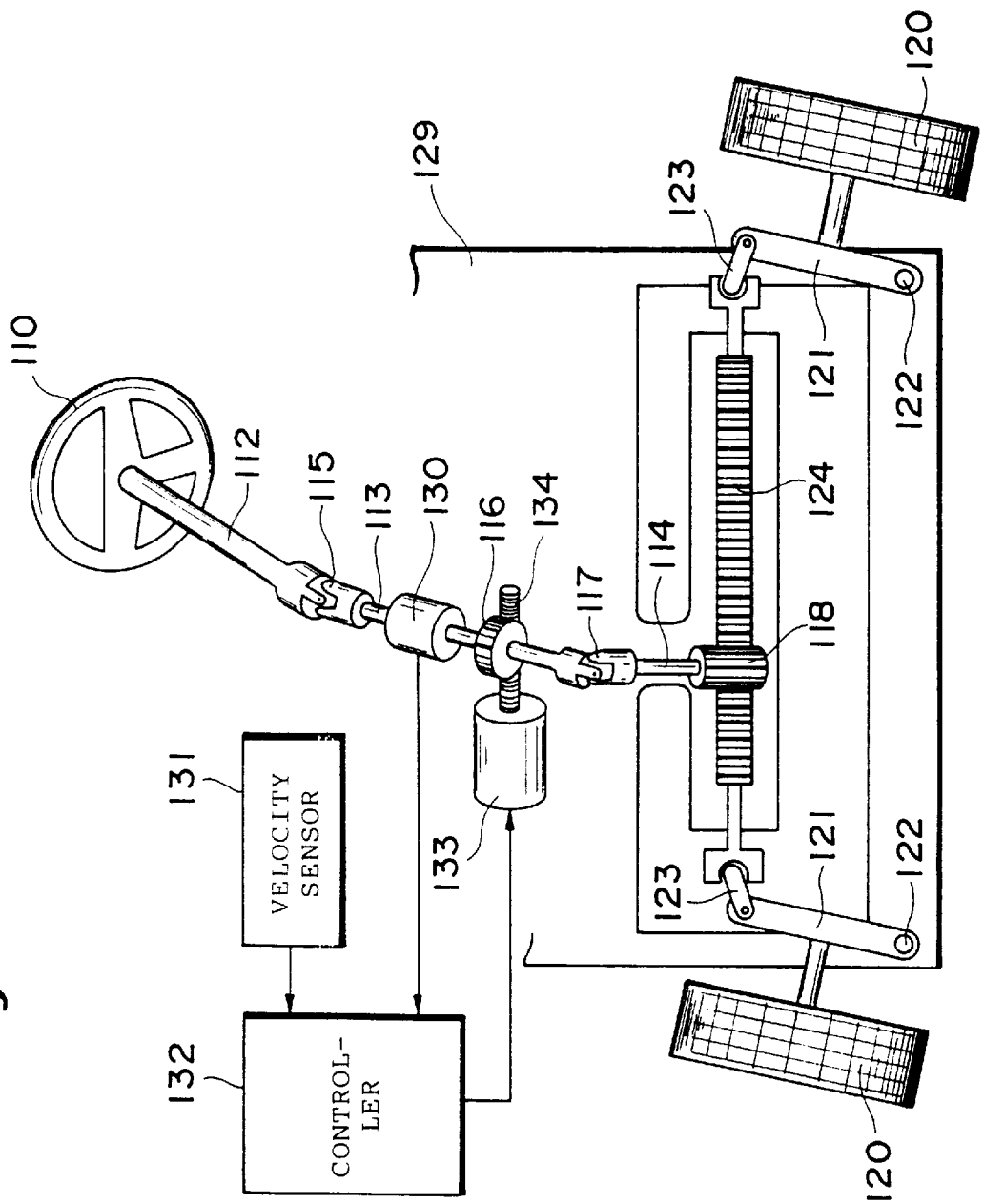
FIG. 27, which illustrates an example of application (first aspect), shows the construction of an electrically driven power steering apparatus.

As shown in FIG. 27, a steering shaft 112 to which a steering wheel 110 has been attached is connected to a first rotary shaft 113 by a joint 115. The first rotary shaft 113 is connected to a second rotary shaft 114 by a joint 117. A pinion 118 is secured to the second rotary shaft 114 and is in mesh with a rack 124 provided on chassis 129 so as to be free to slide transversely of the chassis.

Bases 121 are freely pivotably attached at one end thereof to both sides of the chassis 129 by shafts 122. Wheels 120 are mounted on the bases 121. The other end of each base 121 is connected to a respective end portion of the rack 124 by a link 123.

The traveling speed of the vehicle is sensed by a velocity sensor 131. The latter senses the amount of rotation of the output shaft of the transmission, by way of example. The speed sensed by the speed sensor 131 is applied to a power-steering controller 132.

A torque sensor 130 for sensing a torsional torque which acts upon the first rotary shaft 113 is provided. The torque sensor 130 is a magnetostrictive stress sensor described in the first through third embodiments. The torque sensed by the torque sensor 130 is applied to the controller 132.

An auxiliary motor 133 for power steering is provided. The rotating force of the auxiliary motor 133 is transmitted from a ball screw 134 to a ball gear 116. The gear 116 is secured to the first rotary shaft 113.

On the basis of sensed speed and sensed torque applied thereto, the controller 132 calculates a steering auxiliary torque in accordance with a prescribed algorithm. The controller 132 controls the auxiliary motor 133 in such a manner that the calculated auxiliary torque is generated. A change in the direction of the wheels 120 is carried out based upon the sum of the torque applied to the steering wheel 110 and the torque generated by the auxiliary motor 133.

The magnetostrictive stress sensors according to the first through third embodiments are capable of sensing a torsional torque, so long as such torque is applied to a rotary shaft, even if the rotary shaft is not rotating. Accordingly, as long as a torque is being applied to the steering shaft 112 by the steering wheel 110, the power steering apparatus acts and is capable of assisting steering.

Example of Application (2)

Torque control apparatus

In a power apparatus which includes a motor as a driving source and a power transmission mechanism (e.g., transmission unit) for transmitting the rotating force of the motor to the output shaft of the power apparatus via the power transmission mechanism, a torque control apparatus controls the motor in such a manner that the torque which appears at the output shaft is rendered constant (i.e., in such a manner that the torque is made to agree with a target value).

In an arrangement in which there is no power transmission mechanism and the output shaft of the motor is the output shaft of the power apparatus, torque control of the output shaft results in torque control of the motor and therefore it will suffice to control the output torque of the motor. Control of the output torque of the motor is achieved by controlling the current which flows into the motor. In this case, it will suffice if a motor current sensor is provided; a torque sensor is unnecessary.

However, in a case where the rotating force of the motor is transmitted to the output shaft of the power apparatus via the power transmission mechanism, inertia and viscosity (e.g., gear inertia or viscosity) in the power transmission mechanism must be taken into account. In order to hold the torque of the output shaft at a constant value (or to make it agree with a target value), it is necessary to sense the torque of the output shaft.

Figure 28:
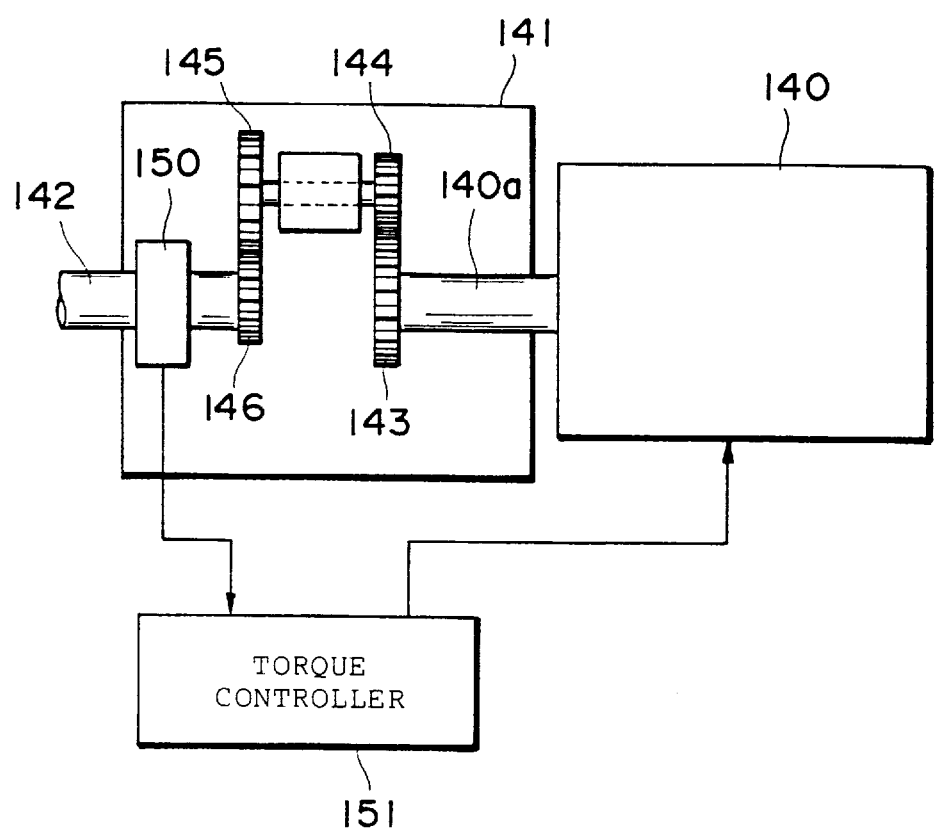
FIG. 28, which illustrates an example of application (second aspect), shows the construction of a torque control apparatus.
Figure 29:
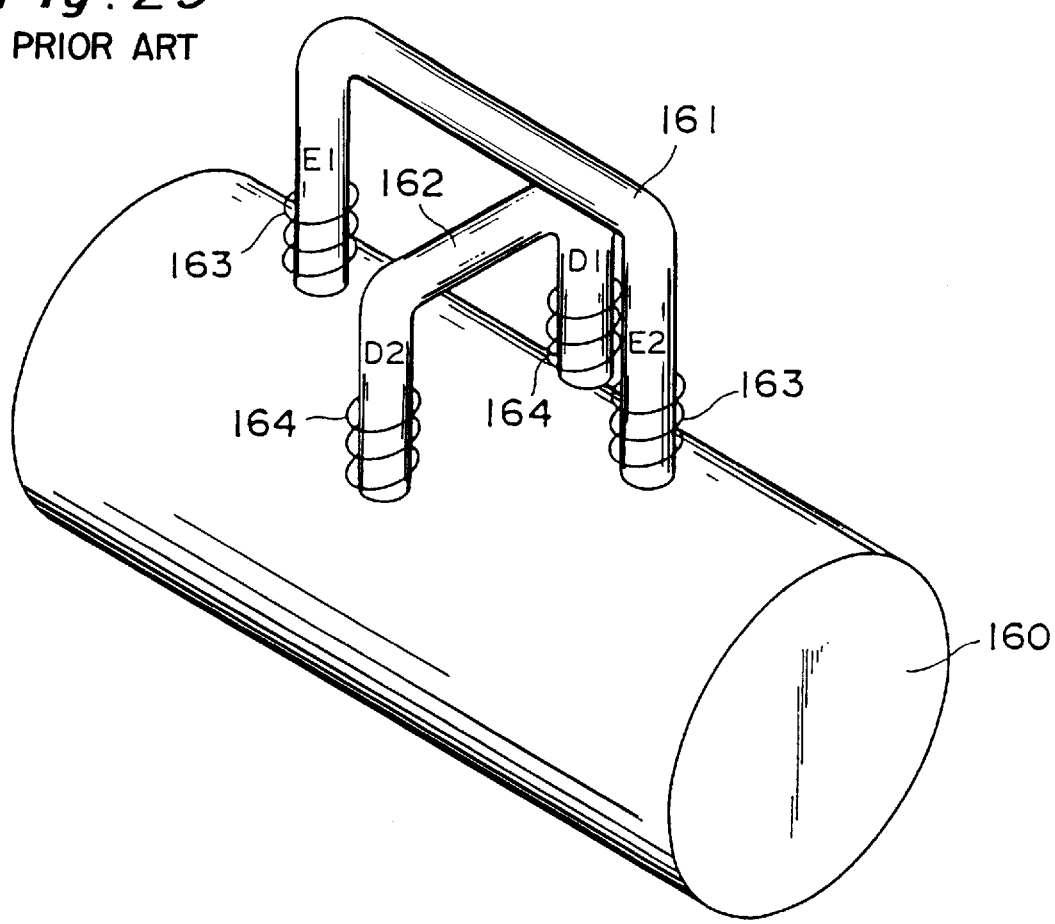
FIG. 29 is a perspective view showing an example of the prior art.
Figure 30:
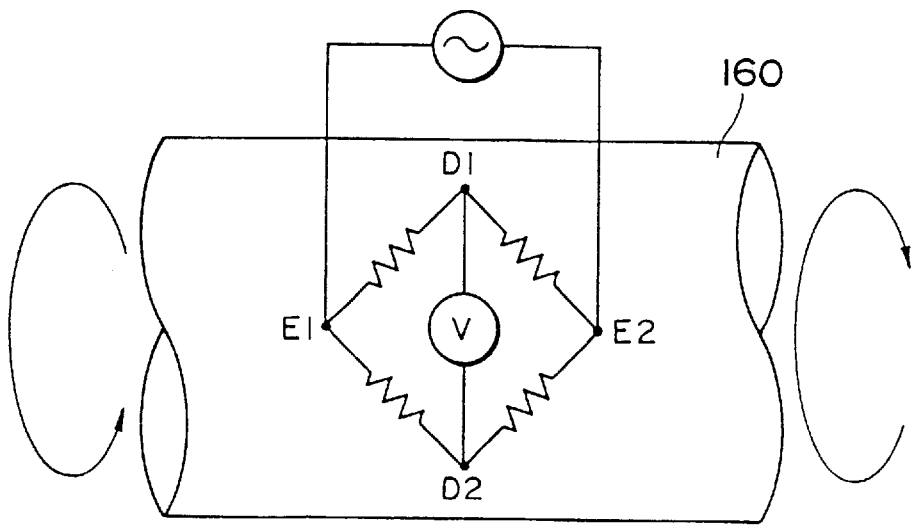
FIG. 30 illustrates a magnetic equivalent circuit in an example of the prior art.

In FIG. 28, the power apparatus is composed of a motor 140 and transmission unit 141. Numerous gears 143~146 are provided in the transmission unit 140. The rotating force of an output shaft 140a of the motor 140 is transmitted to an output shaft 142 of the power apparatus via gears 143~146.

The output shaft 142 of the power apparatus is provided with a torque sensor 150. The torque sensor 150 is constituted by a stress sensor according to the above-described first to third embodiments. The torque sensed by the torque sensor 150 is applied to the torque controller 151. The torque controller 151 controls the motor 140 in such a manner that the sensed torque is rendered constant or made to approach a target value.

The torque sensor 150 can be provided on any rotary shaft inside the transmission unit 140.

What is claimed is:

1. A magnetostrictive stress sensor comprising:
   a plate-shaped circular core in which a groove is formed in the diametric direction passing through the center of the core;
   a plate-shaped yoke coupled to said circular core; and
   a detection coil comprising a winding wound about said core and through said groove in such a manner that the winding describes a semicircle and such that when a current is passed through the winding, a current will always flow through linear portions of the winding, which pass through said groove, in the same direction and through portions of the winding about said core in opposite directions at both sides of said groove.

2. A magnetostrictive stress sensor comprising:
   a plate-shaped circular core in which two grooves are formed in the shape of a cross passing through the center of the core;
   a plate-shaped yoke coupled to said circular core;
   a first detection coil comprising a first winding wound through one of said grooves in such a manner that the first winding describes a semicircle and such that when a current is passed through the first winding, a current will always flow through linear portions of the first winding, which pass through said one groove, in the same direction and through portions of the first winding about said core in opposite directions on both sides of said one groove; and
   a second detection coil comprising a second winding wound through the other of said grooves in such a manner that the second winding describes a semicircle and such that when a current is passed through the second winding, a current will always flow through linear portions of the second winding, which pass through said other groove, in the same direction and through portions of the second winding about said core in opposite directions on both sides of said other groove.

3. A magnetostrictive stress sensor according to claim 1, wherein said circular core and plate-shaped yoke are shaped to conform to an outer circumferential surface of a member to undergo measurement.

4. A magnetostrictive stress sensor according to claim 1, wherein said detection coil is so arranged that the linear portion of said detection coil perpendicularly intersects a direction of stress which acts upon a member and is to be sensed.

5. A magnetostrictive stress sensor having a detection coil comprising at least two semicircular coil patterns formed on at least one film in such a manner that linear portions of these coil patterns are made to coincide to construct a circle, said at least two semicircular coil patterns being connected so as to form one current path in such a manner that when a current is passed through these coil patterns, a current will flow through the linear portions of the coil patterns in the same direction and through semicircular arcuate portions of the coil patterns in opposite directions.

6. A magnetostrictive stress sensor having a detection coil comprising two semicircular coil portions, which are formed by being wound in mutually opposing directions, disposed in such a manner that linear portions are made to coincide to construct a circle, said two coil portions being constituted by a single conductor wire and being so arranged that a current flows through the linear portions of said two coil portions in the same direction when a current is passed through the conductor wire, wherein a core exhibiting a high permeability is provided on one face of the detection coil.

7. A magnetostrictive stress sensor according to claim 2, wherein said circular core and plate-shaped yoke are shaped to conform to an outer circumferential surface of a member to undergo measurement.

8. A magnetostrictive stress sensor according to claim 2, wherein said detection coil is so arranged that the linear portion of said detection coil perpendicularly intersects a direction of stress which acts upon the member and is to be sensed.

* * * * *